US011272805B2

(12) United States Patent
Granger et al.

(10) Patent No.: US 11,272,805 B2
(45) Date of Patent: *Mar. 15, 2022

(54) REMOVABLE CUP SUPPORT PLATFORM ON COLLECTOR RECEPTACLE

(71) Applicant: NESTEC S.A., Vevey (CH)

(72) Inventors: Eric Granger, Lausanne (CH); Pietro Mazza, Lausanne (CH); Antoine Cahen, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 911 days.

This patent is subject to a terminal disclaimer.

(21) Appl. No.: 15/537,489

(22) PCT Filed: Dec. 14, 2015

(86) PCT No.: PCT/EP2015/079567
§ 371 (c)(1),
(2) Date: Jun. 19, 2017

(87) PCT Pub. No.: WO2016/096706
PCT Pub. Date: Jun. 23, 2016

(65) Prior Publication Data
US 2017/0360246 A1    Dec. 21, 2017

(30) Foreign Application Priority Data

Dec. 18, 2014    (EP) .................................... 14198710

(51) Int. Cl.
*A47J 31/44* (2006.01)
*A47J 31/46* (2006.01)
(52) U.S. Cl.
CPC ......... *A47J 31/4428* (2013.01); *A47J 31/462* (2013.01)

(58) Field of Classification Search
CPC ........................... A47J 31/4428; A47J 31/462
(Continued)

(56) References Cited

U.S. PATENT DOCUMENTS 3,417,895 A * 12/1968 Penton .................... B65D 51/28
220/522
4,266,665 A * 5/1981 Nelson ............... B65D 83/0038
206/445
(Continued)

FOREIGN PATENT DOCUMENTS

CN         1875831 A      12/2006
CN       102481066 A       5/2012
(Continued)

OTHER PUBLICATIONS

China Patent Office Communication for Application No. 201580068737.X, dated Jan. 26, 2021, 21 pages.

*Primary Examiner* — Phuong T Nguyen
(74) *Attorney, Agent, or Firm* — K&L Gates LLP

(57) ABSTRACT

A beverage preparation machine (1) comprises: a beverage preparation module (20, 30) having a front face (21) with an outlet (31) for dispensing a prepared beverage; and a cup support (10) located under the outlet (31) for placing a cup (2) under the outlet (31). The cup support (10) comprises a liquid collection receptacle (14) supporting a removable cup placement platform (16) that has a peripheral part (18). The collection receptacle (14) is delimited by at least one upright peripheral sidewall (15) forming a seat (15') for placing the platform (16). The peripheral part (18) extends over and above the peripheral sidewall (15) when the platform (16) is placed in the seat (15') so that the platform (16) is seizable at the peripheral part (18) adjacent the peripheral sidewall (15) by a user-hand for removing the platform (16) from the receptacle (14).

18 Claims, 5 Drawing Sheets

(58) Field of Classification Search
USPC ......... 99/323, 284, 304, 307, 275, 279, 306, 99/289 R; 426/431, 433; 248/211
See application file for complete search history.

(56) References Cited

U.S. PATENT DOCUMENTS

| | | | | |
|---|---|---|---|---|
| 6,058,721 | A * | 5/2000 | Midden | A23G 9/045 62/136 |
| 2007/0266861 | A1 * | 11/2007 | Hart | A47J 31/4403 99/279 |
| 2010/0236414 | A1 * | 9/2010 | Frigeri | A47J 31/4403 99/275 |
| 2011/0023722 | A1 * | 2/2011 | Tonelli | A47J 31/4428 99/279 |
| 2012/0298258 | A1 * | 11/2012 | Rithener | A47J 31/00 141/285 |
| 2014/0246456 | A1 * | 9/2014 | Huang | A47J 31/4428 222/108 |

FOREIGN PATENT DOCUMENTS

| | | |
|---|---|---|
| CN | 103002783 A | 3/2013 |
| CN | 203195445 U | 9/2013 |
| WO | 2014127848 | 8/2014 |

* cited by examiner

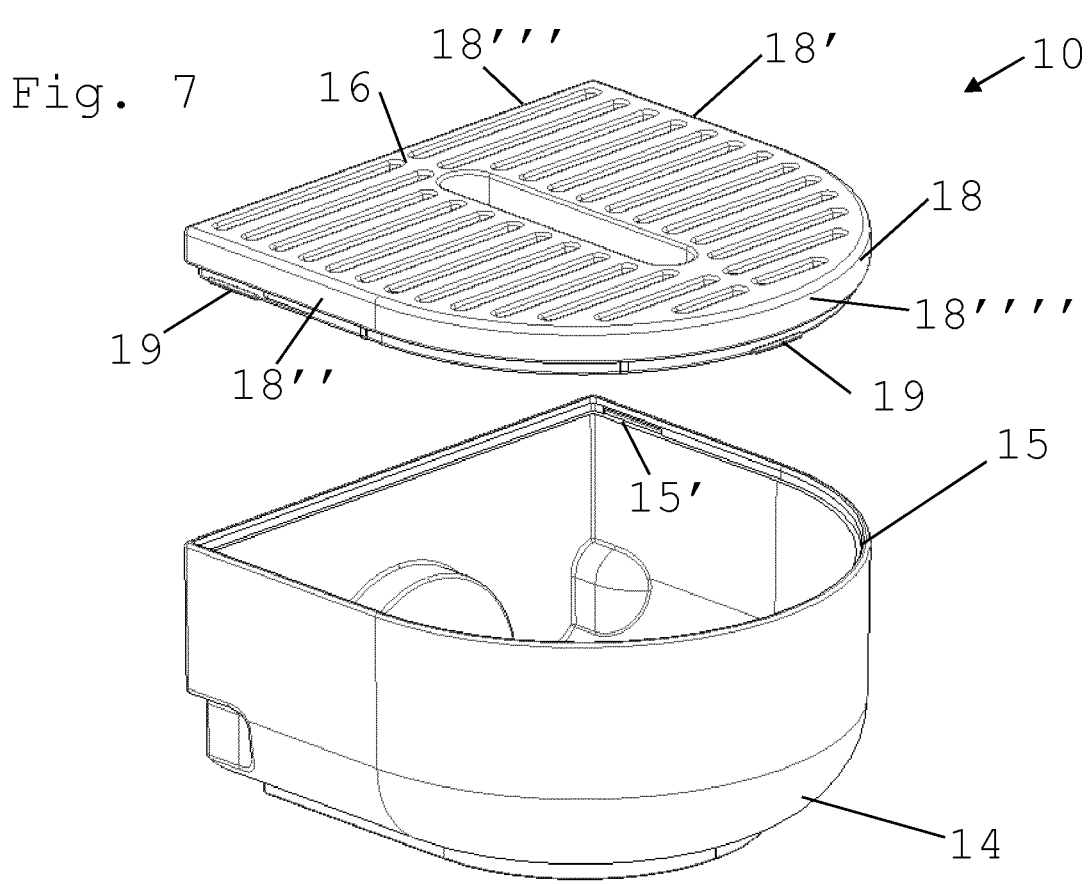
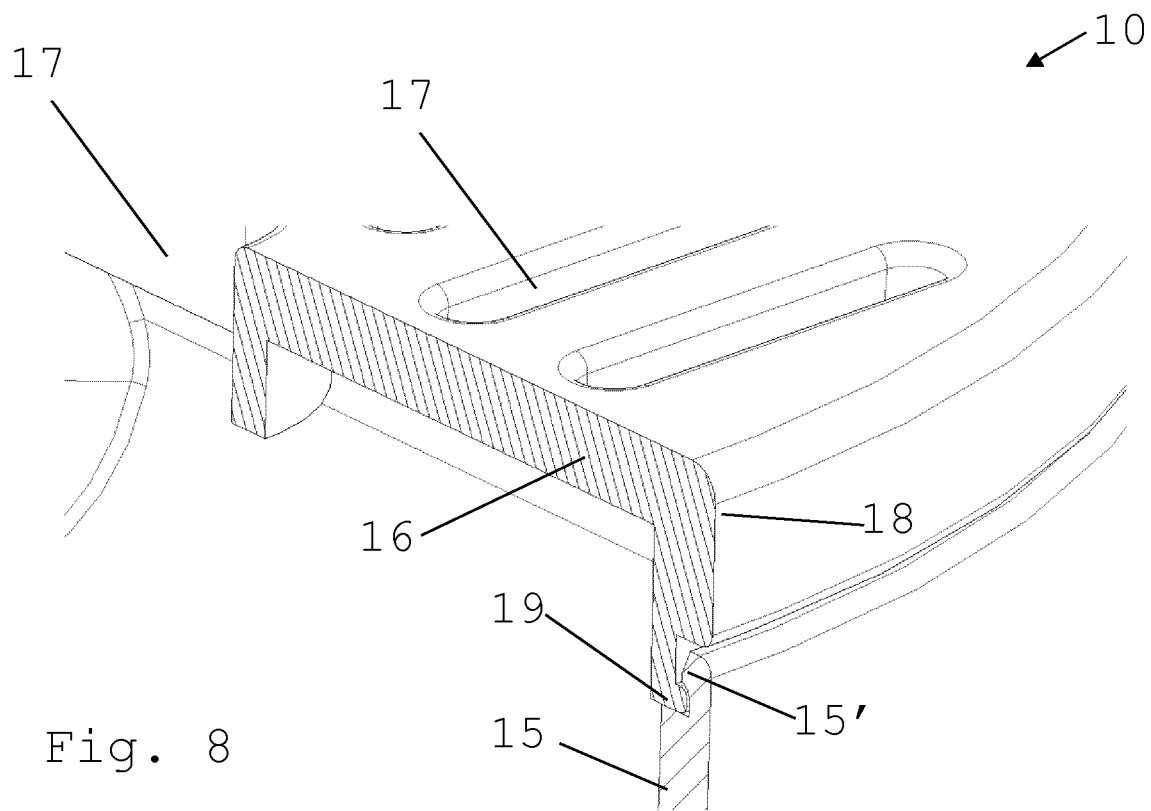

REMOVABLE CUP SUPPORT PLATFORM ON COLLECTOR RECEPTACLE

CROSS REFERENCE TO RELATED APPLICATIONS

The present application is a National Stage of International Application No. PCT/EP2015/079567, filed on Dec. 14, 2015, which claims priority to European Patent Application No. 14198710.7, filed on Dec. 18, 2014, the entire contents of which are being incorporated herein by reference.

FIELD OF THE INVENTION

The field of the invention pertains to beverage dispensing machines having a cup support. For instance, the machines use capsules of an ingredient of the beverage to be prepared.

For the purpose of the present description, a "beverage" is meant to include any human-consumable liquid substance, such as tea, coffee, hot or cold chocolate, milk, soup, baby food, etc . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Examples of fluid circuits are disclosed in U.S. Pat. Nos. 2,715,868, 5,392,694, 5,943,472, 5,992,298, 6,554,588, WO 2006/032599, WO 2009/024500, WO 2009/150030 and WO 2010/006953.

Usually, the beverage outlet is located above a grid for supporting a cup or other recipient under the outlet and for the passage of possible drips from the beverage outlet or other spills into a collector tray located under the grid. Examples of such machines are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313 and WO 2013/186339.

SUMMARY OF THE INVENTION

An object of the invention is to provide an improvement or at least an alternative to the above mentioned beverage machines. Another object of the invention is to provide a beverage machine with a simple, ergonomic and/or safe cup support arrangement.

The invention thus relates to machines for dispensing a beverage from a beverage outlet to cups, for instance to cups of different sizes, in particular to short cups, e.g. espresso cups, and tall cups such as mugs, e.g. cappuccino cups. The machine may be configured to prepare beverages from capsules.

For the purpose of the present description, a "beverage" is meant to include any human-consumable liquid substance, such as tea, coffee, hot or cold chocolate, milk, soup, baby food, etc . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

The beverage preparation machine can be an in-home or out of home machine. The machine may be a coffee, tea, chocolate, cacao, milk, soup, baby food, etc . . . preparation machine. The machine may be arranged for preparing within a beverage processing module a beverage by passing hot or cold water or another liquid through a capsule containing an ingredient, such as a flavoring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage.

For instance, a predetermined amount of beverage is formed and dispensed on user-request, which corresponds to a serving. The volume of such a serving may be in the range of 25 to 200 ml or up to 300 or 400 ml, e.g. the volume for filling a cup or mug, depending on the type of beverage. Formed and dispensed beverages may be selected from ristrettos, espressos, lungos, cappuccinos, café latte, americano coffees, teas, etc . . . In particular, a coffee machine may be configured for dispensing espressos, e.g. an adjustable volume of 20 to 60 ml per serving, and/or for dispensing lungos, e.g. a volume in the range of 70 to 150 ml per serving.

In particular, the invention relates to a beverage preparation machine that comprises a beverage preparation module having a front face with an outlet for dispensing a prepared beverage. For instance, the module is configured to circulate a liquid e.g. water from a liquid reservoir to the outlet.

Further details on suitable reservoirs are for example disclosed in WO2007/135136, WO 2010/128109, WO 2011/083103, WO 2011/089210 and EP 2 228 633. Beverage outlet configurations are for instance disclosed in WO 2009/043630, WO 2012/072758 and WO 2013/127907.

Alternatively, the module can be connected directly to the tap that serves as a source of liquid, e.g. water.

The module can include at least one of a liquid driver, a thermal conditioner and a beverage mixing cavity e.g. a chamber controlled by an actuator for receiving a beverage ingredient. Such an ingredient may be provided within a capsule, via an ingredient passage. The ingredient may be mixed in the chamber with the liquid to prepare the beverage.

Examples of modules that handle an ingredient contained in a capsule are disclosed in EP 1 646 305, EP 1 859 713, EP 1 859 714, WO 2009/043630, WO 2012/025258 and WO 2013/127476 and the references cited therein.

Examples of modules provided with a fluid circuit including a thermal conditioner and/or a liquid driver are disclosed in EP 1 253 844, EP 1 380 243 and EP 1 809 151, WO 2009/074550, WO 2009/130099, WO 2009/150030, WO 2010/108700, WO 2011/107574 and WO 2013/098173.

Typically, the module is provided with an external housing and/or a user-interface, e.g. an on-off switch and/or a beverage preparation selector.

The machine further comprises a cup support located under the outlet. The cup support is configured for placing a cup under the outlet. For instance, the cup support is removable from under the outlet to permit a placement on a placement surface in front of the front face under the outlet of a mug that is larger (typically taller) than the above cup. The placement surface for the mug may be formed by a support external to the machine or by a foot of the machine, e.g. a foot extending under the cup support when the cup support is located under the outlet.

Such an external support can be a kitchen or dining table or any generally stable and horizontal surface that is able to support the weight of the beverage preparation machine and the mug.

Such a principle is for example disclosed in WO 2013/104636 and WO 2013/186339.

The cup support comprises a liquid collection receptacle supporting a removable cup placement platform that has a peripheral part. The collection receptacle is delimited by at least one upright peripheral sidewall forming a seat for placing the platform. For instance, the placement platform has at least one through-passage for evacuating liquid to the collection receptacle from above the platform when placed above the receptacle.

Typically, the platform comprise an arrangement for draining liquid through the platform, such as a grid-like arrangement.

In accordance with the invention the peripheral part extends over and above the peripheral sidewall when the platform is placed in the seat so that the platform is seizable at the peripheral part adjacent the peripheral sidewall by a user-hand for removing the platform from the receptacle. For instance, the peripheral part extends over and above and beyond the peripheral sidewall.

Hence, with this configuration, to remove the platform from the liquid collector, the user has neither to turn the cup support upside down nor to seize the platform by sticking a finger into a larger opening in the platform. Hence, the risk of unwanted exposure to residual liquid in the receptacle of the cup support or on the platform of the cup support can be minimised.

The peripheral part may have at least two seizable edges that are located generally opposite to one another across the platform.

The peripheral part may include one or more seizable edges that extend around the entire platform.

Hence, the platform may be seized by a user-hand from opposite edges of the platform. Such opposite edges may be spaced by a distance of 5 to 20, e.g. 7 to 15 cm, to allow safe single-handed seizure of the platform.

The receptacle and the platform can have an arrangement for fastening the receptacle and the platform together. The fastening arrangement may include at least one of:

- a magnetic fastener, e.g. the receptacle having one or more permanent magnets and the platform comprising a ferromagnetic material or vice versa, such as a permanent magnet made of iron, nickel, cobalt, rare earth metals, e.g. lanthanide, and alloys and oxides containing such metals as well as polymers (e.g. plastics) carrying such elements and components and/or a ferromagnetic material made of at least one of Co, Fe, $Fe_2O_3$, $FeOFe_2O_3$, $NiOFe_2O_3$, $CuOFe_2O_3$, $MgO Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SMCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$, alternatively both the receptacle and the platform may be fitted with permanent magnets;
- a friction fastener, e.g. the peripheral sidewall forming a rim and the peripheral part having one or more lower edges extending inside and/or outside the peripheral rim and tightening the peripheral part to the sidewall by friction;
- a screw fastener, e.g. the platform forming a screw cap on the receptacle;
- a hook fastener; and
- a bayonet fastener.

The fastening arrangement should be sufficient to provide a stable fastening of the platform and the receptacle, typically maintaining the platform and the receptacle together when turned upside down. The fastening arrangement should however be manually unfastenable without undue burden by any ordinary consumer.

For instance, the peripheral part has a lower edge forming a hook and the upright peripheral sidewall has an upper edge forming a hook. In this configuration, the lower edge hook and the upper edge hook are hooked together when the platform is placed in the seat. Optionally, the peripheral sidewall has a plurality of spaced apart hooks and the peripheral part has a plurality of spaced apart hooks so that the hooks or the peripheral sidewall and of the peripheral part are hooked together when the platform is placed in the seat. The peripheral sidewall may form a rim into which or around which the hook of the peripheral part extends for being hooked to the upper edge hook, the hooks being arranged to be unhooked by urging the lower edge of the peripheral part towards a middle part of the platform or by urging the peripheral sidewall towards a middle part of the receptacle. For instance, the lower edge of the peripheral part extends downwardly from the platform and/or upwardly from the rim when the hooks are hooked together.

The cup support may have a rear face removably assembled to the front face by a connector arrangement such as a mechanical and/or magnetic connector arrangement.

The connector arrangement can be a mechanical connector arrangement and can comprise a front hook on the front face disassemblable from a corresponding rear hook on the rear face, the rear hook having a retaining element and the front hook having a retaining element, the retaining elements being mutually engaged when the cup support is assembled to the front face and disengaged when the cup support is disassembled from the front face.

The liquid collection receptacle may comprise the rear face and the rear hook.

The rear hook can be recessed in the rear face and the front hook can project out of the front face, or vice versa.

The retaining element of the rear hook may extend generally in parallel to the rear face and the retaining element of the front hook may extend generally in parallel to the front face, so that the rear face and the front face are relatively slid in parallel one over another to move the retaining elements:
- together from disengagement into mutual engagement to assemble the rear face to the front face; and
- apart from mutual engagement into disengagement to disassemble the rear face from the front face.

The rear hook with its retaining element may generally extend in cross-section along two converging directions and the front hook with its retaining element may generally extend in cross-section along two correspondingly converging directions, so as to facilitate self-positioning of the rear hook relative to the front hook when the cup support is assembled to the front face. For instance, the converging directions are converging upwardly or converging sideways, such as converging upwardly or sideways for allowing a vertical or a horizontal assembly and disassembly of the cup support and the front face. The converging directions can be straight and/or arched. For instance, each two converging directions of the rear hook and the front hook are in a generally symmetric or asymmetric u- or v-arrangement, such as a generally semi-circular arrangement, semi-elliptic arrangement or an arrangement of two intercepting arch segments forming generally a gothic arch.

The mechanical connector arrangement may comprise two front hooks on the front face disassemblable from two corresponding rear hooks on the rear face, the rear hooks extending in cross-section along parallel directions and the front hooks extending in cross-section along corresponding parallel directions, e.g. straight directions. For instance, the front hooks are provided with convergingly directed retaining elements and the rear hooks are provided with divergently directed retaining elements or vice versa, so that the rear hooks slide within the front hooks or vice versa.

The rear hook(s) with its/their retaining element(s) may generally extend in cross-section along two directions contained in a straight or curved virtual plane and the front hook(s) with its/their retaining element(s) may generally extend in cross-section along two directions in a straight or curved virtual plane, the straight or curved virtual planes being optionally generally upright or at an angle thereto.

The machine's module may include: a main module bearing the outlet; and a service unit having a unit face that is part of said front face. The main module can have a seat into which the service unit is insertable and from which the service unit is removable, e.g. for emptying or filling or cleaning the unit, the unit face bearing part of the connector arrangement such as a front hook. The outlet may extend from an outlet face that is part of the front face such as an outlet face that is generally flush with the unit face when the unit is in the module seat. The module seat can form a cavity in the main module for receiving the service unit.

The service unit may include a liquid tank for supplying liquid that is circulated towards the outlet by the preparation module.

The service unit can include a waste collector. For instance, the collector comprises at least one of:
- a cavity for collecting solid waste material e.g. a used ingredient; and
- a cavity for collecting liquid waste material e.g. residual beverage and/or liquid draining from the main module.

Examples of service units provided with at least one of a cavity for collecting solid waste material and a cavity for collecting liquid water material are disclosed in WO 2009/074559, WO 2009/135869, WO 2010/128109, WO 2011/086087 and WO 2011/086088.

The service unit may be arranged to be removed from the module seat by pulling the cup support when assembled to the front face.

The front hook can form a grip for removing the service unit from the module seat, such as a grip generally extending:
a) along a u- or v-shape;
b) along a virtual plane that is offset and parallel to the unit face;
c) about at least part of a seizure cavity, such as a seizure cavity delimited by a bottom that is recessed relative to the unit face; or
d) according to a combination of at least two of features a) to c).

For instance, the grip comprises an edge that extends in a direction that is generally opposite to the retaining element of the front hook.

In the context of the present disclosure, the relative orientation of the machine and parts thereof, e.g. references to the machine's top, front, bottom, side, rear, etc., unless specified otherwise, typically relate to the orientation of operation of the machine, e.g. on top of a table, with the machine in front of a user for naturally operating the machine to dispense a beverage.

BRIEF DESCRIPTION OF THE DRAWINGS

The invention will now be described with reference to the drawings, in which:

FIG. 7 is a perspective view of the cup support of FIG. 5 in which the platform is separated from the receptacle;

FIG. 8 is a magnified view of part of the cup support of FIG. 5 illustrating the fastening between the platform and the receptacle.

DETAILED DESCRIPTION

Figure 1:
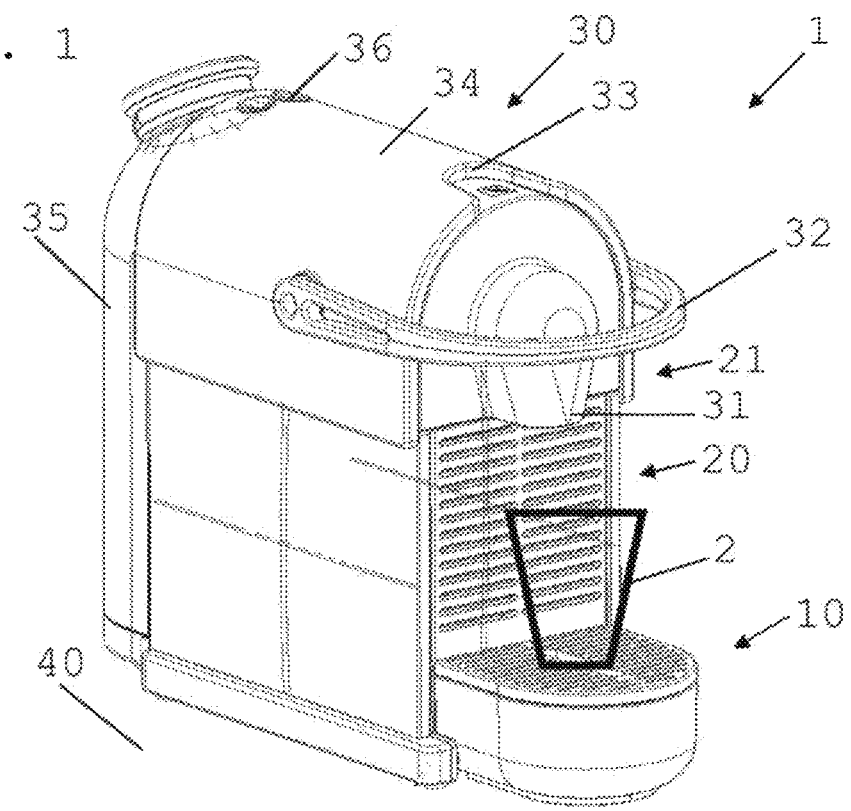
FIG. 1 is a perspective view of a beverage machine according to the invention having a main module, a service unit and a cup support.
Figure 2:
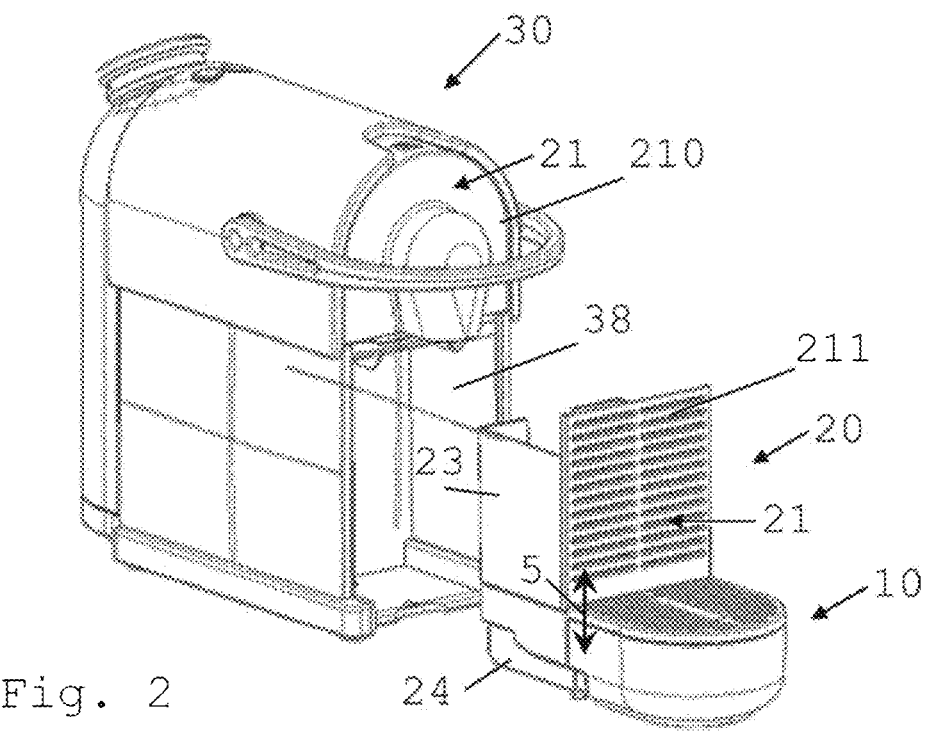
FIG. 2 illustrates the machine of FIG. 1 in which the main module is separated from the service unit and the a cup support.

FIGS. 1 to 9 illustrate exemplary embodiments of a beverage machine 1 according to the present invention. Possible non-limiting alternatives are also indicated by way of example in the following description.

Machine 1 comprises a beverage preparation module 20,30 having a front face 21 with an outlet 31 for dispensing a prepared beverage.

Module 20,30 may be provided with an external housing 34 and/or a user-interface 36.

Machine 1 can be electrically powered, typically by the mains, via an electric cord.

For instance, module 20,30 is configured to circulate a liquid e.g. water from a liquid reservoir 35 to outlet 31. Module 20,30 may comprise at least one of a liquid driver, a thermal conditioner and a beverage mixing cavity e.g. a chamber controlled by an actuator 32 for receiving a beverage ingredient via an ingredient passage 33 and for mixing the ingredient with liquid to prepare the beverage. The ingredient may typically be provided within a capsule.

As illustrated in FIG. 1, machine 1 has a cup support 10 located under outlet 31 for placing a cup 2 (schematically indicated) under outlet 31.

Figure 3:
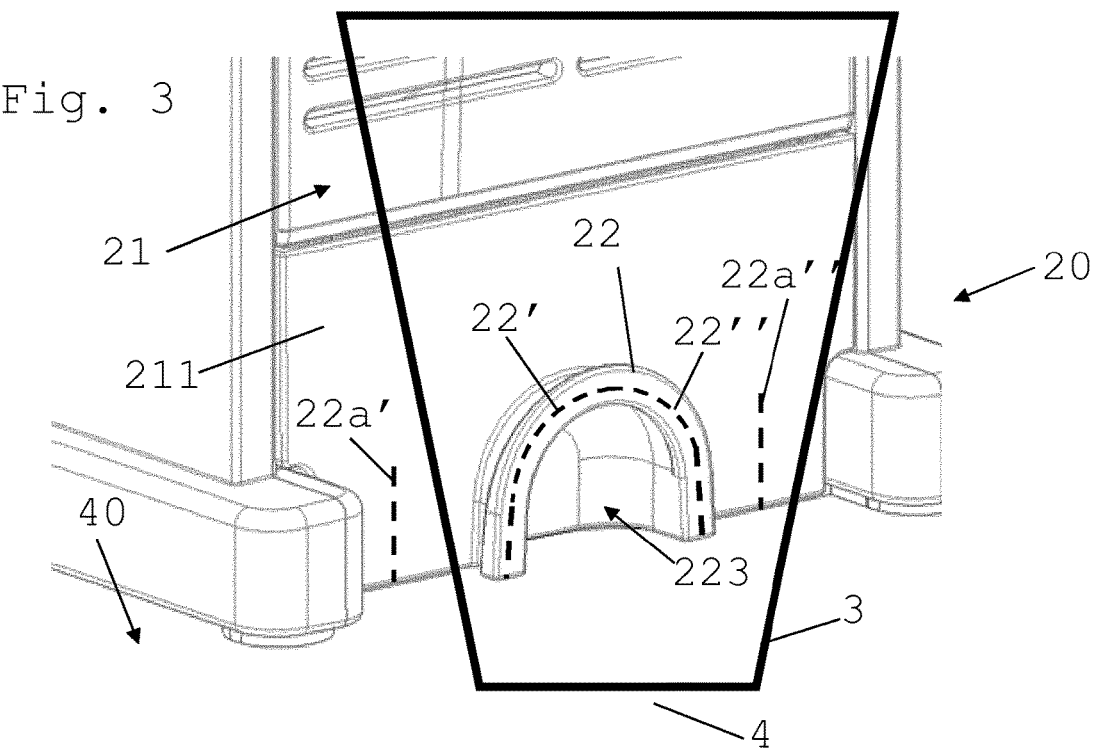
FIG. 3 is a magnified view of part of the main module with the service unit of FIG. 1 after removal of the cup support.
Figure 4:
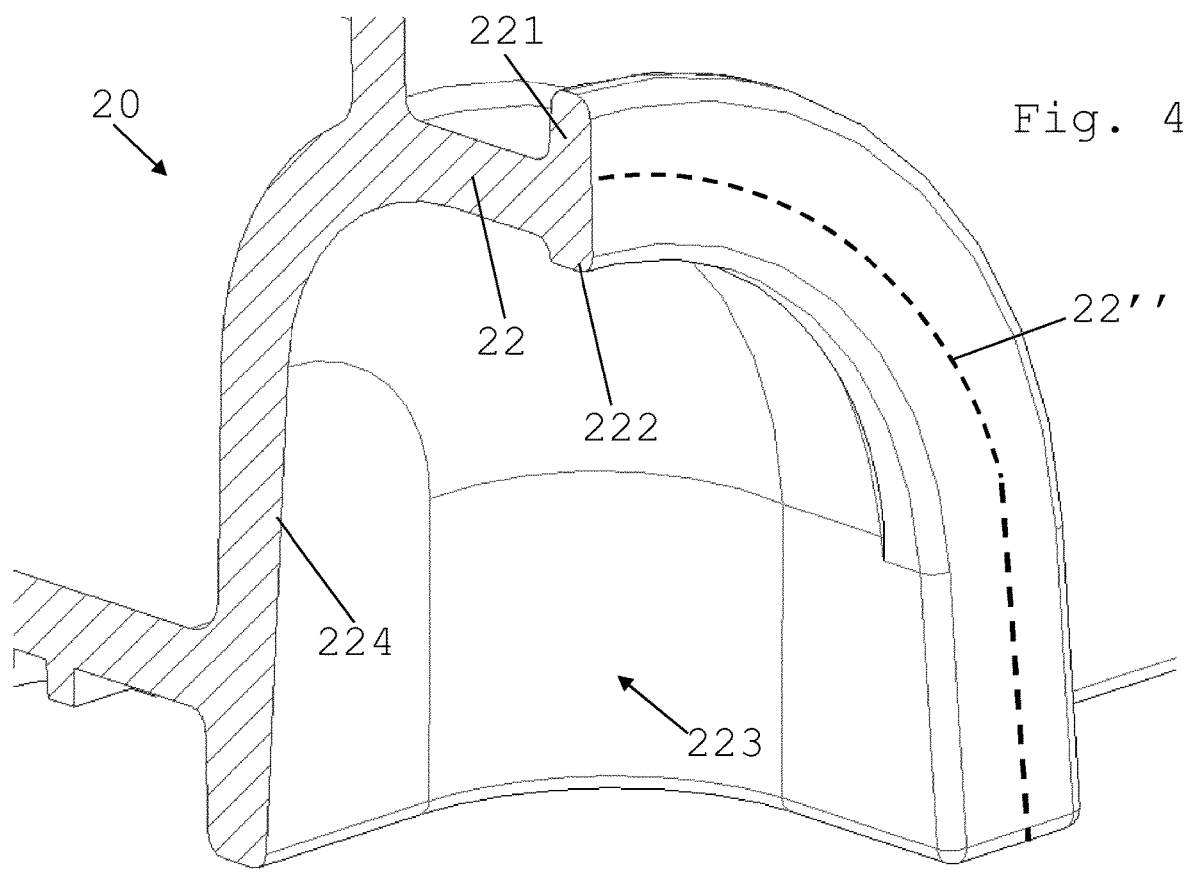
FIG. 4 is a magnified view of part of the service unit of FIG. 3.

For instance, cup support 10 is removable from under the outlet 31 to permit a placement on a placement surface 4 in front of front face 21 under outlet 31 of a mug 3 (schematically indicated) that is larger than cup 2 as illustrated in FIG. 3. Placement surface 4 can be formed by a support 40 external to machine 1 or by a foot of the machine, e.g. a foot extending under cup support 10 when located under outlet 31.

Cup support 10 comprises a liquid collection receptacle 14 supporting a removable cup placement platform 16 that has a peripheral part 18. Collection receptacle 14 is delimited by at least one upright peripheral sidewall 15 forming a seat 15' for placing platform 16. For instance, placement platform has at least one through-passage 17 for evacuating liquid to collection receptacle 14 from above platform 16 when placed above the receptacle 14.

Peripheral part 18 extends over and above peripheral sidewall 15 when platform 16 is placed in seat 15' so that platform 16 is seizable at peripheral part 18 adjacent peripheral sidewall 15 by a user-hand for removing platform 16 from the receptacle 14. For instance, peripheral part 18 extends over and above and beyond peripheral sidewall 15.

Peripheral part 18 may include at least two seizable edges 18',18";18'", 18"" that are located generally opposite to one another across platform 16.

Peripheral part 18 may include one or more seizable edges 18',18",18'",18"" that extend around the entire platform 16.

Receptacle 14 and platform 16 can have an arrangement for fastening receptacle 14 and platform 16 together, such as at least one of:
- a magnetic fastener, e.g. the receptacle having one or more permanent magnets and the platform comprising a ferromagnetic material or vice versa, alternatively both receptacle 14 and platform 16 may be fitted with permanent magnets;
- a friction fastener, e.g. the peripheral sidewall forming a rim and the peripheral part having one or more lower edges extending inside and/or outside the peripheral rim and tightening the peripheral part 18 to sidewall 15 by friction;
- a screw fastener, e.g. the platform forming a screw cap on the receptacle;
- a hook fastener 15',19; and
- a bayonet fastener.

For instance, peripheral part 18 has a lower edge forming a hook 19 and upright peripheral sidewall 15 has an upper edge forming a hook 15'. Lower edge hook 19 and upper edge hook 15' may be hooked together when platform 16 is placed in seat 15'. Peripheral sidewall 15 can have a plurality of spaced apart hooks 15' and peripheral part 18 can have a plurality of spaced apart hooks 19 so that hooks 15',19 are hooked together when platform 16 is placed in seat 15'. See FIGS. 7 and 8.

Peripheral sidewall 15 may form a rim into which (or around which) hook(s) 19 of peripheral part 13 extend(s) for being hooked to upper edge hook 15'. Hooks 15',19 can be arranged to be unhooked by urging the lower edge of peripheral part 18 towards a middle part of the platform (or by urging the peripheral sidewall towards a middle part of the receptacle).

The lower edge of peripheral part 18 may extend downwardly from platform 16 and/or upwardly from the rim when hooks 15',19 are hooked together.

Cup support 10 can have a rear face 11 removably assembled to front face 21 by a connector arrangement 12,22 such as a mechanical and/or magnetic connector arrangement. See FIGS. 3 to 6.

Connector arrangement 12,22 can be a mechanical connector arrangement 12,22 and can comprise a front hook 22 on front face 21 disassemblable from a corresponding rear hook 12 on rear face 11. Rear hook 12 may have a retaining element 121 and front hook 22 may have a retaining element 221. Retaining elements 121,221 may be mutually engaged when cup support 10 is assembled to front face 21 and disengaged when cup support 10 is disassembled from front face 21.

Liquid collection receptacle 14 may comprise rear face 11 and rear hook 12.

Rear hook 12 can be recessed in rear face 11 and front hook 22 can project out of front face 21, or vice versa.

Retaining element 121 of rear hook 12 may extend generally in parallel to rear face 12 and retaining element 221 of front hook 22 may extend generally in parallel to front face 21, so that rear face 11 and front face 21 are relatively slid in parallel one over another (arrow 5 in FIG. 2) to move retaining elements 121,221:
- together from disengagement into mutual engagement to assemble rear face 11 to front face 21; and
- apart from mutual engagement into disengagement to disassemble rear face 11 from front face 21.

Rear hook 12 with its retaining element 121 may generally extend in cross-section along two converging directions 12',12" and front hook 22 with its retaining element 221 may generally extend in cross-section along two correspondingly converging directions 22',22", so as to facilitate self-positioning of rear hook 12 relative to the front hook 22 when cup support 10 is assembled to front face 21. For instance, converging directions 12',12",22',22" are converging upwardly or converging sideways, such as converging upwardly or sideways for allowing a vertical or a horizontal assembly and disassembly of cup support 10 and front face 21.

Converging directions 12',12",22',22" can be straight and/or arched. For instance, each two converging directions 12',12",22',22" of rear hook 12 and front hook 22 are in a generally symmetric or asymmetric u- or v-arrangement, such as a generally semi-circular arrangement, semi-elliptic arrangement or an arrangement of two intercepting arch segments forming generally a gothic arch.

Figure 5:
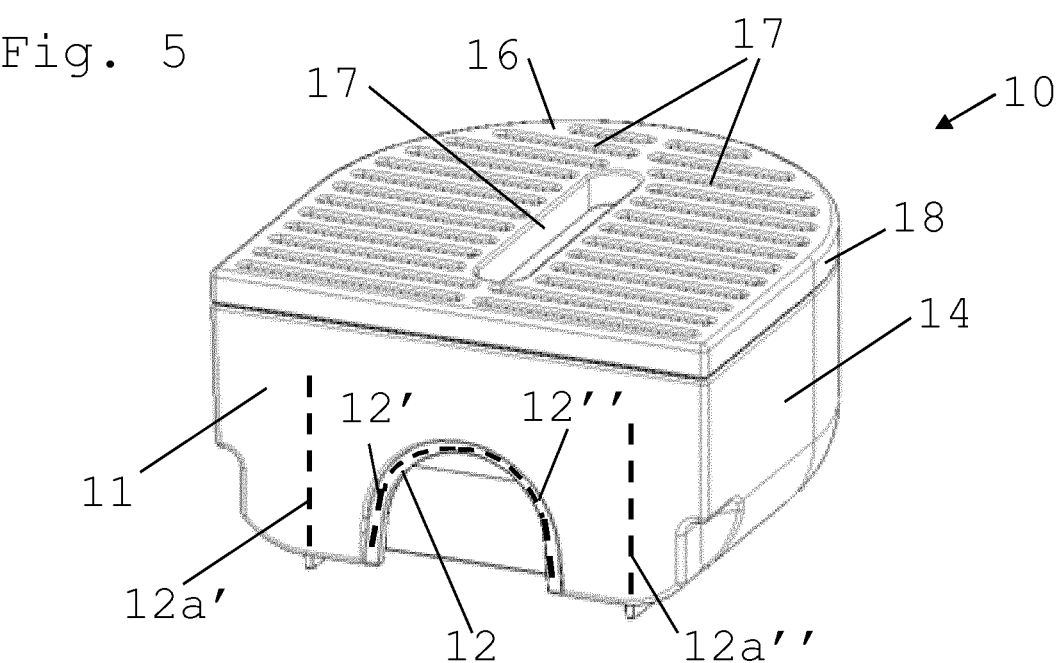
FIG. 5 is a perspective view of the cup support of the machine of FIG. 1, the cup support having a removable placement platform assembled to a liquid collection receptacle.
Figure 6:
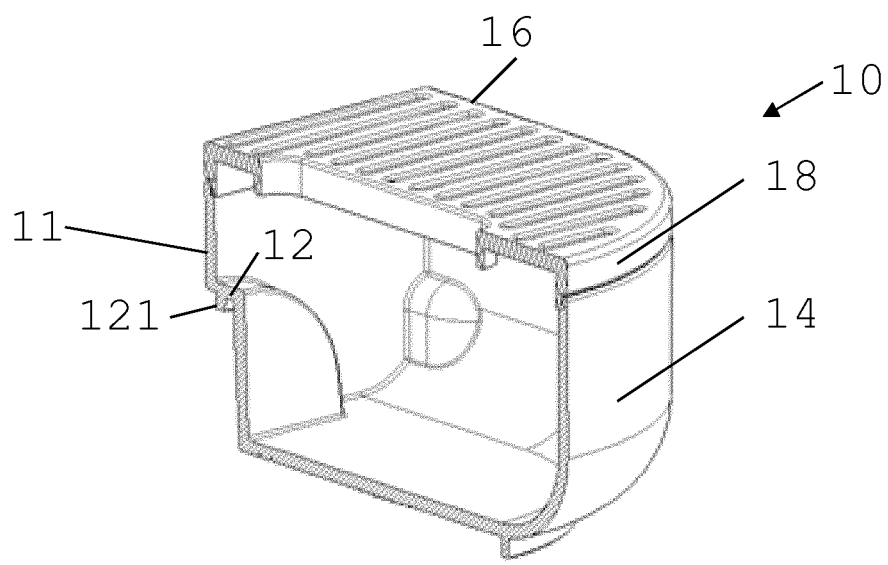
FIG. 6 is a view from a different perspective of part of the cup support of FIG. 5.
Figure 9:
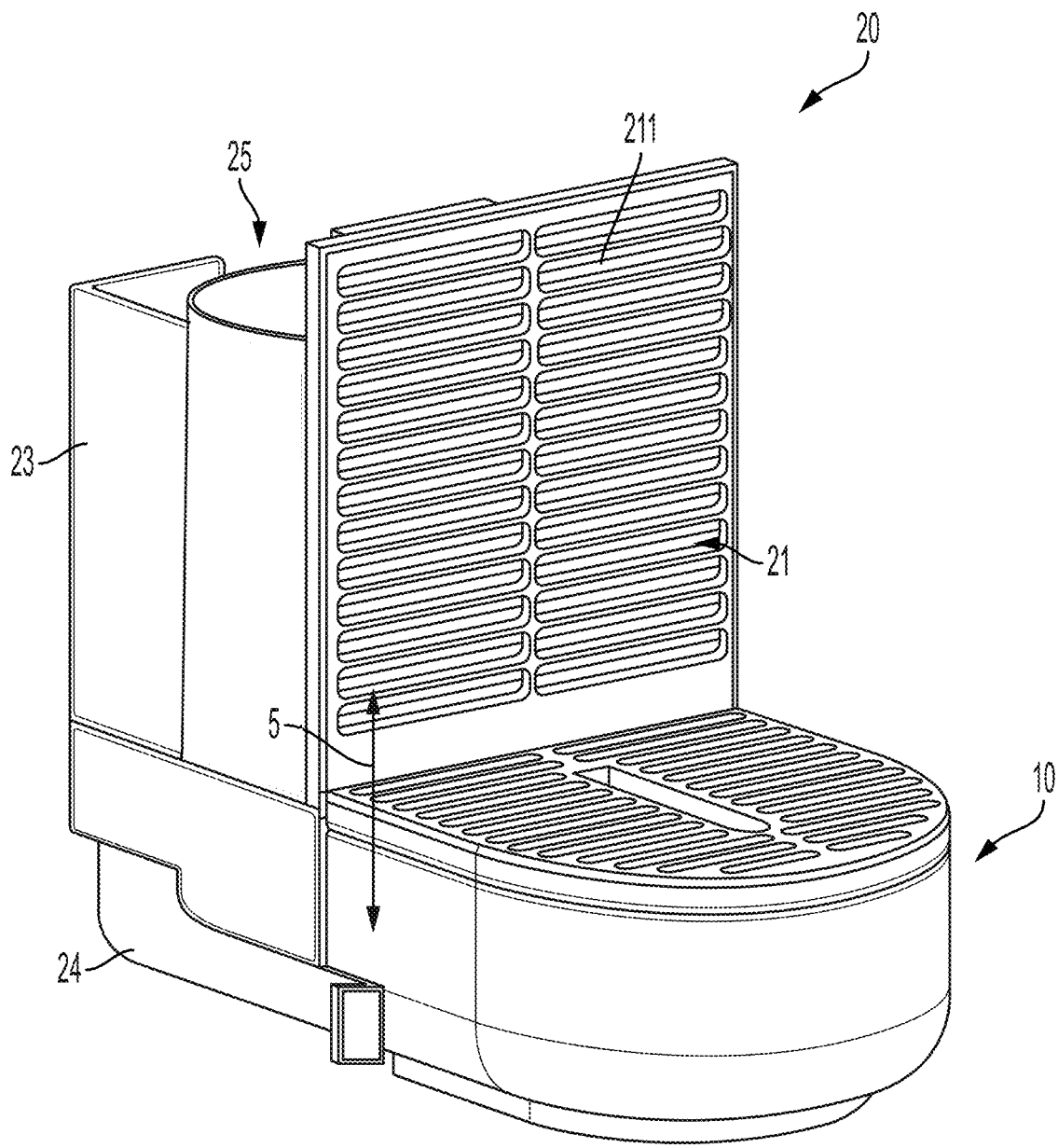
FIG. 9 illustrates the machine of FIG. 1 in which the main module is separated from the service unit and the cup support.

The mechanical connector arrangement may comprise two front hooks on front face 21 disassemblable from two corresponding rear hooks on rear face 11, the rear hooks extending in cross-section along parallel directions 12a',12a" and the front hooks extending in cross-section along corresponding parallel directions 22a',22a", such as straight directions 12a',12a",22a',22a". This is schematically illustrated in FIGS. 3 and 5 (only the directions 12a',12a",22a',22a" of the hooks being shown). For instance, the front hooks are provided with convergingly directed retaining elements and the rear hooks are provided with divergently directed retaining elements or vice versa so that the rear hooks slide within the front hooks or vice versa.

Tear hook(s) 12 with its/their retaining element(s) 121 may generally extend in cross-section along two directions 12',12" contained in a straight or curved virtual plane and front hook(s) 22 with its/their retaining element(s) 221 may generally extend in cross-section along two directions 22', 22" in a straight or curved virtual plane. For instance, the straight or curved virtual planes are generally upright or at an angle thereto.

Module 20,30 may comprise: a main module 30 bearing outlet 31; and a service unit 20 having a unit face 211 that is part of front face 21. Main module 30 can have a seat 38 into which service unit 20 is insertable and from which service unit 20 is removable, e.g. for emptying or filling or cleaning unit 20, unit face 211 bearing part of connector arrangement 12,22 e.g. a front hook 22.

Outlet 31 may extend from an outlet face 210 that is part of front face 21 such as an outlet face 210 that is generally flush with unit face 211 when unit 20 is in module seat 38.

Module seat 38 may form a cavity in main module 30 for receiving service unit 20.

Service unit 20 may include:
a liquid tank 25 for supplying liquid that is circulated towards outlet 31 by preparation module 20/30 (FIG. 9); and/or
a waste collector 23,24, such as a collector comprising at least one of:
a cavity 23 for collecting solid waste material e.g. a used ingredient; and
a cavity 24 for collecting liquid waste material e.g. residual beverage and/or liquid draining from the main module 30.

Service unit 20 can be arranged to be removed from module seat 38 by pulling cup support 10 when assembled to front face 21.

When present, front hook 22 can form a grip 221,222 for removing service unit 20 from module seat 38. Grip 221,222 may generally extend:
a) along a u- or v-shape 22',22";
b) along a virtual plane that is offset and parallel to the unit face 211;
c) about at least part of a seizure cavity 223 such as a seizure cavity delimited by a bottom 224 that is recessed relative to the unit face 211; or
d) according to a combination of at least two of features a) to c), For instance, grip 221,222 comprises an edge 222 that extends in a direction that is generally opposite to retaining element 221 of front hook 22.

The invention claimed is:

1. A beverage preparation machine comprising:
a beverage preparation module having a front face with an outlet configured for dispensing a prepared beverage;
a cup support located under the outlet and configured for placing a cup under the outlet;
the cup support comprising a liquid collection receptacle supporting a removable cup placement platform that has a peripheral part, the liquid collection receptacle being defined by at least one upright peripheral sidewall; and
the peripheral part extends over and above the at least one upright peripheral sidewall when the removable cup placement platform is placed in a seat such that at least a portion of the removable cup placement platform is positioned above a top of the liquid collection receptacle when the removable cup placement platform is in the seat, and such that the removable cup placement platform is seizable at the peripheral part adjacent the at least one upright peripheral sidewall by a user-hand for removing the removable cup placement platform from the liquid collection receptacle, the peripheral part comprises:
at least two seizable edges that are located generally opposite to one another across the removable cup placement platform; or
one or more seizable edges that extend around the entire removable cup placement platform; and
the peripheral part has a lower edge forming a plurality of lower edge hook portions, the at least one upright peripheral sidewall has an upper edge forming a plurality of upper edge hook portions, the plurality of lower edge hook portions and the plurality of upper edge hook portions are configured such that each lower edge hook portion and a corresponding upper edge hook portion are hooked together when the removable cup placement platform is placed in the seat, and the plurality of lower edge hook portions and the plurality of upper edge hook portions comprise a first lower edge hook portion and corresponding upper edge hook portion and further comprise an opposing second lower edge hook portion and corresponding upper edge hook portion when the removable cup placement platform is placed in the seat.

2. The machine of claim 1, wherein the liquid collection receptacle and the removable cup placement platform have an arrangement for fastening the liquid collection receptacle and the removable cup placement platform together, the arrangement selected from the group consisting of:
a magnetic fastener;
a friction fastener;
a screw fastener;
a hook fastener; and
a bayonet fastener.

3. The machine of claim 1, wherein the at least one upright peripheral sidewall forms a rim into which or around which the plurality of lower edge hook portions extends for being hooked to the plurality of upper edge hook portions, the plurality of lower edge hook portions and the plurality of upper edge hook portions configured to be unhooked by urging the plurality of lower edges of the peripheral part towards a middle part of the removable cup placement platform or by urging the at least one upright peripheral sidewall towards a middle part of the liquid collection receptacle.

4. The machine of claim 1, wherein the cup support has a rear face removably assembled to the front face by a connector arrangement.

5. The machine of claim 4, wherein the connector arrangement is a mechanical connector arrangement and comprises a front hook on the front face disassemblable from a corresponding rear hook on the rear face, the rear hook having a first retaining element and the front hook having a second retaining element, the first retaining element and the second retaining element configured to engage when the cup support is assembled to the front face and disengage when the cup support is disassembled from the front face.

6. The machine of claim 5, wherein the first retaining element of the rear hook extends generally in parallel to the rear face and wherein the second retaining element of the front hook extends generally in parallel to the front face, so that the rear face and the front face are configured to slide in parallel one over another to move the first and the second retaining elements:

together from disengagement into mutual engagement to assemble the rear face to the front face; and apart from mutual engagement into disengagement to disassemble the rear face from the front face.

7. The machine of claim 5, wherein the rear hook generally extends in cross-section along two converging directions, and the front hook generally extends in cross-section along two correspondingly converging directions, to facilitate self-positioning of the rear hook relative to the front hook when the cup support is assembled to the front face.

8. The machine of claim 7, wherein the two converging directions are straight and/or arched.

9. The machine of claim 5, wherein the mechanical connector arrangement comprises two front hooks on the front face disassemblable from two corresponding rear hooks on the rear face, the two rear hooks extending in cross-section along parallel directions, and the two front hooks extending in cross-section along corresponding parallel directions.

10. The machine of claim 5, wherein the rear hook generally extends in cross-section along two directions contained in a straight or curved virtual plane, and the front hook generally extends in cross-section along two corresponding directions in a straight or curved virtual plane.

11. The machine of claim 4, wherein the connector arrangement is a magnetic connector arrangement.

12. The machine of claim 1, wherein the beverage preparation module comprises:

a main module bearing the outlet; and a service unit having a unit face that is part of the front face, the main module having a main module seat into which the service unit is insertable and from which the service unit is removable.

13. The machine of claim 12, wherein the service unit comprises:

a liquid tank configured for supplying liquid that is circulated towards the outlet by the beverage preparation module; and a waste collector.

14. The machine of claim 12, wherein a front hook forms a grip for removing the service unit from the main module seat.

15. The machine of claim 1, wherein the removable cup placement platform has at least one through-passage for evacuating liquid to the liquid collection receptacle from above the removable cup placement platform when placed above the liquid collection receptacle.

16. The machine of claim 1, wherein the seat is formed by the at least one upright peripheral sidewall.

17. The machine of claim 1, wherein the plurality of lower edge hook portions and the plurality of upper edge hook portions are configured to be hooked by urging the lower edge of the peripheral part towards a middle part of the removable cup placement platform or by urging the at least one upright peripheral sidewall towards a middle part of the liquid collection receptacle.

18. The machine of claim 1, wherein the at least two seizable edges are spaced by a distance between 5 cm and 20 cm to allow seizure of the removable cup placement platform by a single user-hand.

* * * * *